April 16, 1968 W. W. SMITH 3,378,281
UNIVERSAL CONNECTING JOINT
Filed Sept. 23, 1963 2 Sheets-Sheet 1
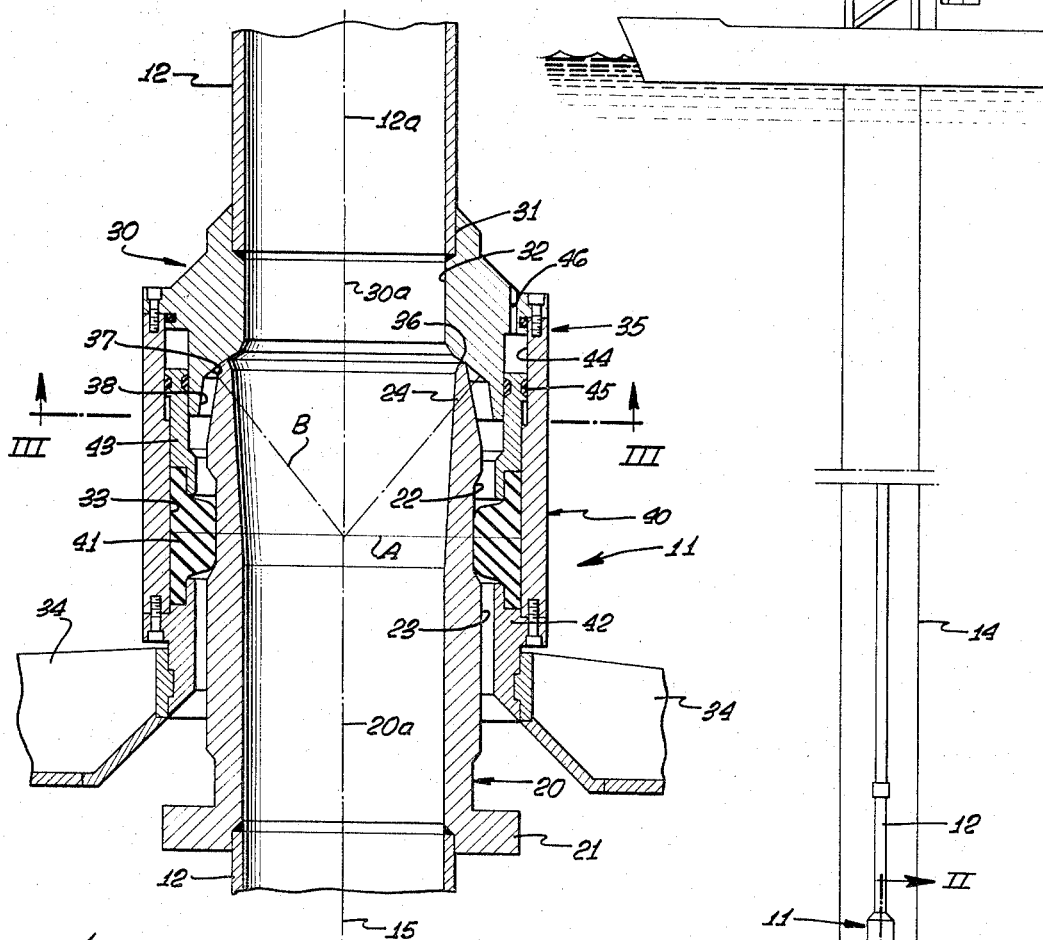
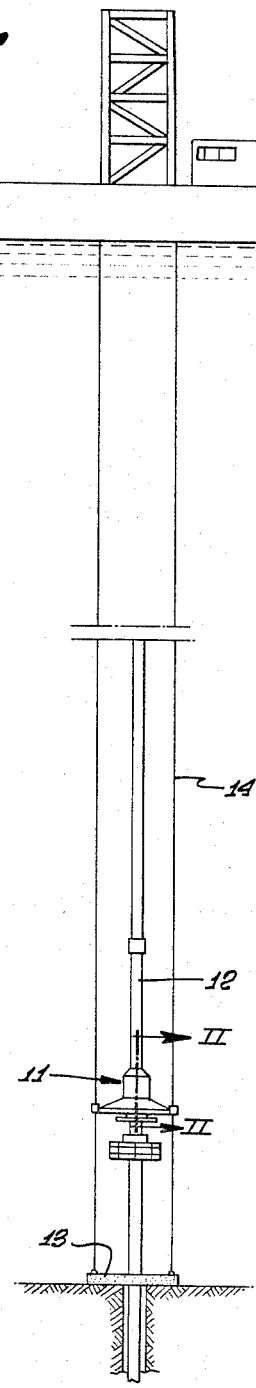
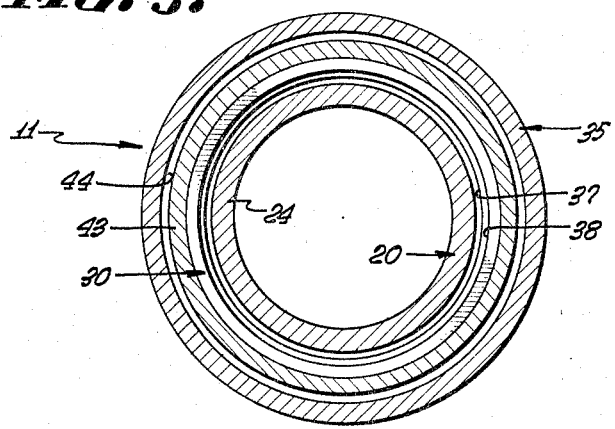
INVENTOR.
WARREN W. SMITH
BY
Miketta & Glenny
ATTORNEYS.

April 16, 1968  W. W. SMITH  3,378,281
UNIVERSAL CONNECTING JOINT
Filed Sept. 23, 1963  2 Sheets-Sheet 2
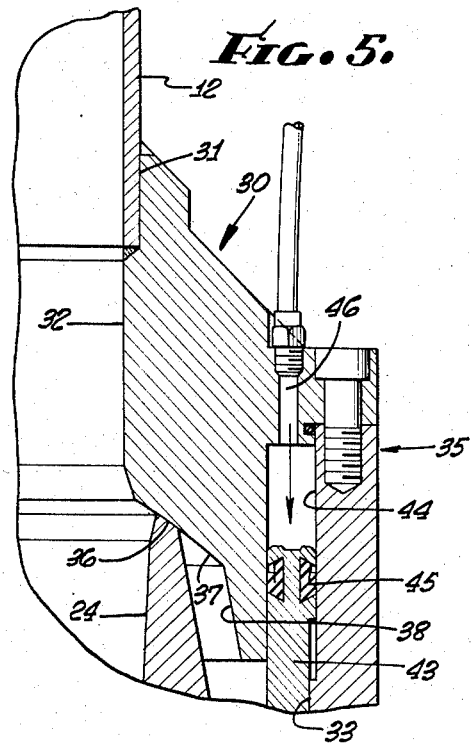
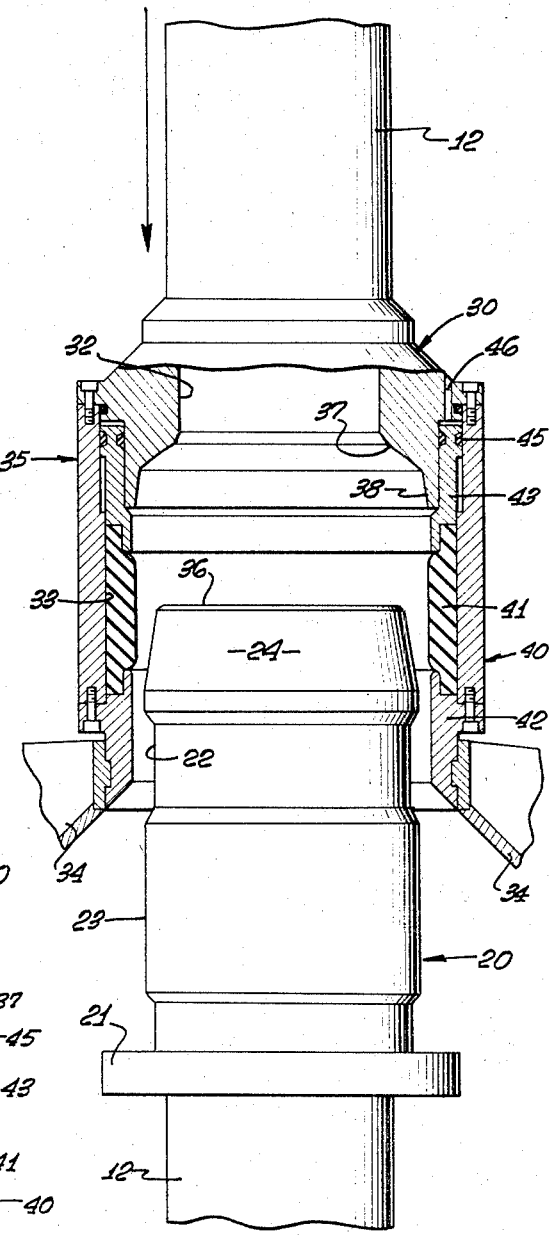
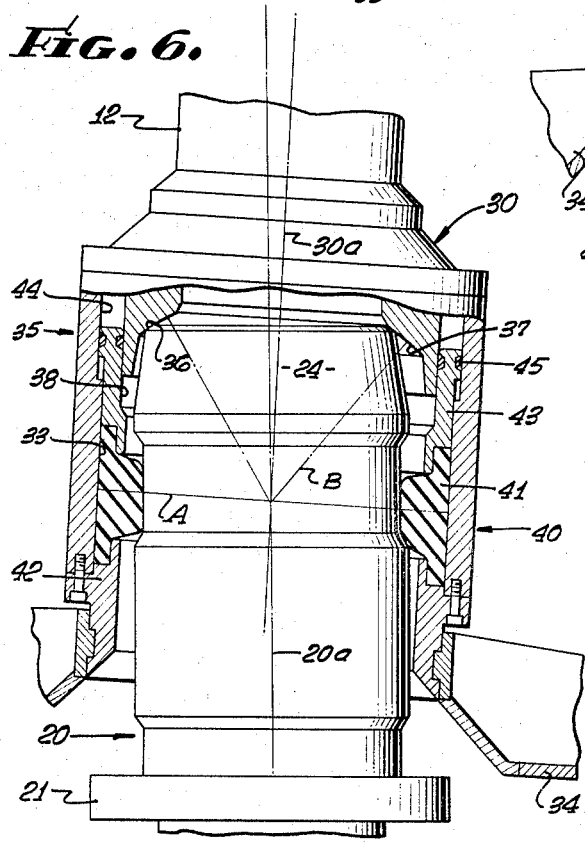
WARREN W. SMITH
INVENTOR.
BY Miketta & Glenny
ATTORNEYS.

United States Patent Office 3,378,281
Patented Apr. 16, 1968

3,378,281
UNIVERSAL CONNECTING JOINT
Warren W. Smith, Garden Grove, Calif., assignor to Shaffer Tool Works, Brea, Calif., a corporation of California
Filed Sept. 23, 1963, Ser. No. 310,631
7 Claims. (Cl. 285—27)

This invention relates to a universal connecting joint and more particularly to flexible, safety, universal connecting joint which is adapted for use with a normally vertical drill pipe conductor of a sub-sea oil well drilling rig to permit lateral movement and shifting of the drilling platform without causing damage to the drill pipe conductor.

In drilling sub-sea oil wells, the problem has arisen of finding an adequate flexible connector device for use at the floor of the sea. When drilling from a floating rig in open sea the natural water current causes the drilling rig to float away from a normal position vertically above the well hole.

Prior proposed connectors of the rigid type are completely unsuited for the purpose intended. By rigidly connecting the drill pipe conductor to the ocean floor, unnecessary stresses and strains are developed in the drill pipe conductor causing it to bow or bend out of a normal vertical drilling position. These unnecessary stresses and strains many times cause the connector to fail or the drill pipe conductor itself to snap off or to be damaged.

Since lateral movement of the floating drilling rig is virtually impossible to prevent, a flexible connector is needed to permit lateral movement of the drilling rig and which will not create unnecessary stresses and strains in the drill pipe conductor. Such a connector should preferably be remotely controllable, and quickly releasable.

The universal connecting joint of the present invention obviates the many disadvantages attendant with rigid connectors. The device of the present invention provides a flexible safety joint that is normally in a vertical or normal position, but which can flex universally under lateral movement of the drilling rig within certain limits. This universal flexing of the connecting joint permits a continuous drilling operation without danger of losing the drill pipe conductor as a result of the natural random floating of the drilling rig.

Accordingly, it is a general object of the present invention to provide a universal connecting joint that avoids all of the foregoing disadvantages of connectors used heretofore.

An object of the present invention is to disclose and provide a universal connecting joint which is flexible and operates as a safety joint.

Another object is to disclose and provide a universal connecting joint which can be remotely operated to create a quickly releasable connecting joint.

A further object is to disclose and provide a universal connecting joint which permits lateral movement of a drilling rig without adversely affecting the drilling operation.

Another object is to provide a universal connecting joint which has the ability to strip off under abnormal tensile loads.

Other objects and advantages of this invention will be readily apparent from the following description when considered in connection with the appended drawings.

In the drawings:

FIG. 1 illustrates a diagrammatic, sub-sea drilling rig or apparatus which shows one exemplary environment or use for the connecting joint of the present invention.

FIG. 2 is an enlarged, elevation view of the device of the present invention in section taken along the plane II—II of FIG. 1 showing the device in the normally connected, vertical position wherein the drill pipe conductor and the well hole are in axial alignment.

FIG. 3 illustrates a transverse view of the device in section taken along plane III—III of FIG. 2.

FIG. 4 is an elevation view of the device, partially in section, showing the relationship of the elements during the assembly of the joint.

FIG. 5 is an enlarged fragmentary elevation view of the device in section showing portions of the connected device in greater detail.

FIG. 6 is an elevation view of the device, partially in section, similar to FIG. 2 except the drill pipe conductor is out of axial alignment with the well hole.

Referring now to the drawings, wherein like reference characters designate like or corresponding parts throughout the several views, there is shown in FIG. 1 an exemplary flexible, safety, universal connecting joint device 11 of the present invention as it may be used to flexibly connect a drill pipe conductor 12 to a base member 13 of a sub-sea drilling apparatus 14.

Universal connecting joint 11 (FIG. 2) has inner and outer hollow cylindrical members 20 and 30, respectively; each having an axis 20a and 30a, respectively. When the joint is in a normal vertical position, axis 12a of drill pipe conductor 12, axis 15 of the well hole and axes 20a and 30a of inner and outer members 20 and 30 are all adapted to be coincident and in axial alignment.

Inner member 20 may be securely connected to base member 13 by any well-known means (not shown) associated with the flange 21 provided at the lower end of inner member 20. Inner member 20 may include an upper end 24 and an annular locking groove 22 on the outer surface 23 thereof between upper end 24 and lower flange 21.

Outer member 30 may be connectd to drill pipe conductor 12 by any well-known means (not shown) as at 31. Outer member 30 may have a first internal bore 32 which is virtually a continuation of drill pipe conductor 12. A larger second internal bore 33 is provided in outer member 30 longitudinally spaced from first bore 32. Guide arms 34 may be provided at the lower end of outer member 30 to aid in guiding outer member 30 into position on inner member 20.

Complementary mating means 35 may be provided on inner member 20 and outer member 30 for permitting pivotal movement of outer member 30 with respect to inner member 20 (see FIG. 6). Such complementary means 35 may include mating spherical zone form surfaces, one such surface being provided at the end 24 of inner member 20 forming a support surface 36 thereon, and the other such surface being provided adjacent first bore 22 of outer member 30 to form a support shoulder 37.

When connecting joint 11 is assembled together, support surface 36 will mate with suport shoulder 37 as best seen in FIG. 5. Due to the mating configuration of surface 36 with shoulder 37, surface 36 will be permitted to slide freely along shoulder 37 when outer member 30 is moved from the vertical position (see FIG. 6).

Limiting means may be provided adjacent support shoulder 37 to limit the pivotal movement of outer member 30 with respect to inner member 20. Such limiting means may include an inwardly and upwardly tapering conical stop shoulder portion 38 which is adapted to engage upper end 24 of inner member 20 when outer member 30 has moved pivotally a predetermined distance.

Remotely operable, releasable sealing and connecting means 40 may be provided within outer member 30 which may be cooperable with annular locking groove 22 to flexibly connect outer member 30 to inner member 20 and seal off any fluid flow therebetween. Such sealing and connecting means 40 may include an annular resilient sealing and connecting element 41 positioned in bore 33 and restrained from longitudinal downward movement therein by an upwardly directed flange 42 rigidly provided on outer member 30. Sealing element 41 may be made from a variety of resilient materials such as natural or synthetic rubbers, such as neoprene having a Shore hardness of 70–80.

As best seen in FIGS. 2 and 6, sealing and connecting element 41 is adapted to be compressed longitudinally, thereby being temporarily deformed radially inwardly to engage and cooperate with locking groove 22 in inner member 20 to connect or assemble outer member 30 with inner member 20.

Means for compressing connecting element 41 may include a longitudinally movable, remotely operable annular piston 43 slidingly received within a longitudinally extending annular channel 44 provided in outer member 30. Seal means 45 may be carried by piston 43 to provide a fluid tight pressure actuated piston. The lower end of piston 43 abuts the end of sealing element 41 whereby and downward and longitudinal movement of piston 43 will compress sealing element 41. As best seen in FIG. 5, a fluid inlet port 46 may be provided in outer member 30 to introduce fluid pressure into channel 44.

As outer member 30 is lowered toward inner member 20 (FIG. 4), sealing means 40 is in an unenergized or uncompressed condition. Guide arms 34 aid in aligning outer member 30 with inner member 20. When outer member 30 reaches the final position, surface 36 engages and mates with surface 37.

Pressure fluid is introduced by a remote control (not shown) through fluid port 46 into the pressure tight channel 44 to pressure-actuate piston 43. As piston 43 moves downwardly, it longitudinally compresses sealing element 41 causing it to temporarily deform radially inwardly. The temporarily deformed sealing element 41 then engages and cooperates with annular groove 22 to connect or assemble outer member 30 with inner member 20. Sealing element 41 also functions as a seal to prevent any fluid flow between outer member 30 and inner member 20, such as sea water attempting to pass between elements 20 and 30 and into the well hole, or circulating fluid being lost to the sea.

As best seen in FIG. 6, support shoulder 37 is free to slide and move along support surface 36 in any direction without disturbing or affecting the sealing connection of sealing element 41 and groove 22. It is therefore preferred that in the connected position, the face of sealing element 41 contacting element 20 is of a smaller width than the bottom of groove 22, thus allowing sliding movement of seal 41 in groove 22 during pivotal movement between elements 20 and 30. This free sliding movement is restrained within limits by stop shoulders 38. Therefore, when water current or other means carries the drilling rig out of vertical alignment with the well hole, drill pipe conductor 12 and outer member 30 can rock back and forth on element 20 without creating unnecessary stresses in the drill pipe conductor or connecting joint. A positive and reliable seal and connection will therefore continuously be present throughout the drilling operation.

It should be noted that when the elements 20 and 30 are connected (FIGS. 2 and 6), the center of the sphere from which surface 36 and shoulder 37 are formed always lies along axis 20a of inner member 20 at the point where axis 20a intersects an imaginary plane A passing through the longitudinal mid-point of the compressed sealing element 41. Therefore, any radius B subtended from the spherical arc of surface 36 or shoulder 37 will intersect imaginary plane A at the same point axis 20a intersects plane A. This relationship is true when the inner and outer members 20 and 30 are in axial alignment (FIG. 2) as well as when they are out of axial alignment (FIG. 6).

Obviously many modifications and variations of the present invention are possible in the light of the above teachings. It is therefore to be understood that within the scope of the appended claims the invention may be practical otherwise than as specifically described.

I claim:
1. A flexible, safety, universal connecting joint adapted to permit limited pivotal movement of a drill pipe conductor from a normal vertical position, comprising:
   inner and outer hollow cylindrical members having axes which are coincident with each other and the axis of the drill pipe conductor when the drill pipe conductor and joint are in a normal vertical position,
   said inner member including an annular locking groove on the outer surface thereof and an end portion having a spherical zone form supporting surface,
   said outer member having a downwardly directed support shoulder on the inner surface thereof of a complementary spherical zone form with said spherical zone form supporting surface and which is adapted to slidingly engage said supporting surface of said inner member when the members are assembled together;
   said outer member having an inwardly and upwardly tapering conical stop shoulder adjacent said support shoulder,
   said stop shoulder adapted to engage said inner member to limit the pivotal movement of said outer member with respect to said inner member;
   an annular resilient sealing and connecting element within said outer member and restrained from longitudinal downward movement therewithin by said outer member,
   said connecting element adapted to be longitudinally compressed and temporarily deformed radially inwardly to engage and cooperate with said locking groove in said inner member to assemble together said outer member with said inner member; and
   a pressure operated, remotely controlled, annular piston longitudinally and slidingly carried by said outer member and longitudinally abutting said connecting element and longitudinally movable to compress connecting element.

2. A universal connecting joint as described in claim 1 wherein:
   a spherical radius normal to said spherical zone form support shoulder and supporting surface intersects a transverse plane passing through the longitudinal mid-point of said annular sealing element along said axis of said inner member in all positions of said outer member with respect to said inner member, when said inner and outer members are assembled.

3. A flexible, safety, universal connecting joint adapted to permit limited pivotal movement of a drill pipe conductor from a normal vertical position, comprising:
   inner and outer hollow cylindrical members having axes which are coincident with each other and the axis of the drill pipe conductor when the drill pipe conductor and joint are in a normal vertical position,
   said inner member including an annular locking groove on the outer surface thereof and an end portion having a spherical zone form supporting surface,
   said outer member having a downwardly directed support shoulder on the inner surface thereof of a complementary spherical zone form with said spherical zone form supporting surface and which is adapted to slidingly engage said supporting surface of said inner member when the members are assembled together;
   said outer member having an inwardly and upwardly tapering conical stop shoulder adjacent said support shoulder,
   said stop shoulder adapted to engage said inner member to limit the pivotal movement of said outer member with respect to said inner member; and remotely operable, releasable sealing and connecting means carried by said outer member and cooperable with said annular locking groove for flexibly connecting said outer member to said inner member and sealing off any fluid flow therebetween.

4. A flexible, safety, universal connecting joint adapted to permit limited pivotal movement of a drill pipe conductor from a normal vertical position, comprising:

inner and outer hollow cylindrical members having axes which are coincident with each other and the axis of the drill pipe conductor when the drill pipe conductor and joint are in a normal vertical position, said inner member including an annular locking groove on the outer surface thereof and an end portion having a spherical zone form supporting surface, said outer member having a downwardly directed support shoulder on the inner surface thereof of a complementary spherical zone form with said spherical zone form supporting surface and which is adapted to slidingly engage said supporting surface of said inner member when the members are assembled together;

said outer member having limiting means adjacent said support shoulder for limiting the pivotal movement of said outer member with respect to said inner member; and remotely operable, releasably sealing and connecting means carried by said outer member and cooperable with said annular locking groove for flexibly connecting said outer member to said inner member and sealing off any fluid flow therebetween.

5. A flexible, safety, universal connecting joint adapted to permit limited pivotal movement of a drill pipe conductor from a normal vertical position, comprising:

inner and outer hollow cylindrical members having axes which are coincident with each other and the axis of the drill pipe conductor when the drill pipe conductor and joint are in a normal vertical position, said inner member including an annular locking groove on the outer surface thereof, complementary mating means on said inner and outer members for permitting limited pivotal movement of said members with respect to each other;

an annular resilient sealing and connecting element within said outer member and adapted to be longitudinally compressed and temporarily deformed radially inwardly to engage and cooperate with said locking groove in said inner member to assemble together said outer member with respect to said inner member; and a pressure operated, remotely controlled, annular piston means carried by said outer member for compressing said connecting element inwardly into engagement with said locking groove.

6. A universal connecting joint as described in claim 5 wherein said complementary means includes:

complementary spherical surfaces in which a spherical radius normal to said spherical surfaces intersects a transverse plane passing through the longitudinal mid-point of said annular seal element along said axis of said inner member in all positions of said outer member with respect to said inner member when said inner and outer members are assembled.

7. A flexible, safety, universal connecting joint adapted to permit pivotal movement of a drill pipe conductor from a normal vertical position, comprising:

inner and outer hollow cylindrical members having axes which are coincident with each other and the axis of the drill pipe conductor when the drill pipe conductor and joint are in a normal vertical position, said inner member including an annular locking groove on the outer surface thereof, complementary spherical means on said inner and outer members for permitting limited pivotal movement of said members with respect to each other; and remotely operable, releasably sealing and connecting means carried by said outer member and cooperable with said annular locking groove for flexibly connecting said outer member to said inner member and sealing off any fluid flow therebetween.

References Cited

UNITED STATES PATENTS

| 2,767,564 | 10/1956 | Green | 285—231 X |
| 3,142,344 | 7/1964 | Otteman et al. | 285—223 X |
| 3,147,992 | 9/1964 | Haeber et al. | 285—18 |
| 2,165,051 | 7/1939 | Hering | 285—261 |

FOREIGN PATENTS

| 10,086 | 7/1887 | Great Britain. |

CARL W. TOMLIN, *Primary Examiner.*

D. W. AROLA, *Assistant Examiner.*